United States Patent
Cohen et al.

(10) Patent No.: US 12,254,384 B2
(45) Date of Patent: Mar. 18, 2025

(54) DEVICE AND METHOD TO IMPROVE THE ROBUSTNESS AGAINST 'ADVERSARIAL EXAMPLES'

(71) Applicants: Robert Bosch GmbH, Stuttgart (DE); Carnegie Mellon University, Pittsburgh, PA (US)

(72) Inventors: Jeremiah M. Cohen, Pittsburgh, PA (US); Frank Schmidt, Leonberg (DE); Jeremy Zieg Kolter, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 878 days.

(21) Appl. No.: 17/272,435

(22) PCT Filed: Jan. 10, 2020

(86) PCT No.: PCT/IB2020/050176
§ 371 (c)(1),
(2) Date: Mar. 1, 2021

(87) PCT Pub. No.: WO2020/161546
PCT Pub. Date: Aug. 13, 2020

(65) Prior Publication Data
US 2021/0319268 A1 Oct. 14, 2021

(30) Foreign Application Priority Data

Feb. 4, 2019 (EP) ..................................... 19155345

(51) Int. Cl.
*G06F 18/2415* (2023.01)
*G06F 18/21* (2023.01)
(Continued)

(52) U.S. Cl.
CPC ......... *G06N 20/00* (2019.01); *G06F 18/2193* (2023.01); *G06F 18/2415* (2023.01);
(Continued)

(58) Field of Classification Search
None
See application file for complete search history.

(56) References Cited

U.S. PATENT DOCUMENTS

2017/0083608 A1  3/2017  Ye et al.
2018/0005118 A1*  1/2018  Kapoor ................... G06N 7/01

FOREIGN PATENT DOCUMENTS

CA       2228062 C       12/2001
CN     104966105 A       10/2015
(Continued)

OTHER PUBLICATIONS

"Robust measures of scale", Wikipedia, downloaded Mar. 10, 2021, pp. 1-3.
(Continued)

*Primary Examiner* — Idowu O Osifade
(74) *Attorney, Agent, or Firm* — NORTON ROSE FULBRIGHT US LLP; Gerard A. Messina

(57) ABSTRACT

A computer-implemented method for assessing a robustness of a smoothed classifier for classifying sensor signals received from a sensor. The method includes: providing an input signal depending on the sensor signal, determining, by the smoothed classifier, a first value which characterizes a probability that the input signal, when subjected to noise will be classified as belonging to a first class, wherein the first class is a most probable class, determining, by the smoothed classifier, a second value which characterizes a probability that the input signal, when subjected to the noise, will be classified as belonging to a second class, wherein the second class is a second-most probable class, determining a robust- (Continued)

ness value on a first inverse value of a standard Gaussian cumulative distribution function at the first value and/or depending on a second inverse value of the standard Gaussian cumulative distribution function at the second value.

10 Claims, 17 Drawing Sheets

(51) Int. Cl.
    *G06F 18/2431*     (2023.01)
    *G06N 7/01*     (2023.01)
    *G06N 20/00*     (2019.01)
    *G06V 10/774*     (2022.01)
    *G06V 10/776*     (2022.01)
    *G06V 10/82*     (2022.01)

(52) U.S. Cl.
    CPC ........... *G06F 18/2431* (2023.01); *G06N 7/01* (2023.01); *G06V 10/774* (2022.01); *G06V 10/776* (2022.01); *G06V 10/82* (2022.01)

(56) References Cited

FOREIGN PATENT DOCUMENTS

| | | |
|---|---|---|
| CN | 107463951 A | 12/2017 |
| JP | 2018206373 A | 12/2018 |

OTHER PUBLICATIONS

International Search Report for PCT/IB2020/050176, Issued Mar. 16, 2020.
Bai Li et al., "Second-Order Adversarial Attack and Certifiable Robustness," Cornell University Library, 2018, pp. 1-14. https://arxiv.org/pdf/1809.03113v1.pdf Downloaded Feb. 25, 2021.
Papernot Nicolas et al., "Distillation as a Defense To Adversarial Perturbations Against Deep Neural Networks," 2016 IEEE Symposium On Security and Privacy (SP), Cornell University Library, 2016, pp. 1-16. <https:/arxiv.org/pdf/1511.04508.pdf> Downloaded Feb. 25, 2021.
Houpu Yao et al., "Improving Model Robustness With Transformation-Invariant Attacks," Cornell University Library, 2019, pp. 1-9. <https://www.researchgate.net/profile/Yezhou-Yang/publication/330775347_Improving_Model_Robustness_with_Transformation-Invariant_Attacks/links/5c7a0dd2299bf1268d30b45a/improving-Model-Robustness-with-Transformation-Invariant-Attacks.pdf?origin=publication_detail> Downloaded Feb. 25, 2021.
Alvira Swalin, "How To Make Your Machine Learning Models Robust to Outliers," 2018, pp. 1-14. <https://heartbeat.fritz.ai/how-to-make-your-machine-learning-models-robust-to-outliers-44d404067d07> Downloaded Feb. 25, 2021.
Mathias Lecuyer et al., "Certified Robustness to Adversarial Examples With Differential Privacy," Cornell University Library, 2019, pp. 1-18. https:/arxiv.org/pdf/1802.03471.pdf Downloaded Feb. 25, 2021.
Jamalzadeh, Mohammadamin: "Analysis of Clickstream Data", (2011) pp. 1-248, Durham E-Theses, Durham University, http://etheses.dur.ac.uk/3366/.

* cited by examiner

DEVICE AND METHOD TO IMPROVE THE ROBUSTNESS AGAINST 'ADVERSARIAL EXAMPLES'

FIELD

The present invention concerns a method for assessing a robustness of a smoothed classifier, a method for assessing an overall robustness of a smoothed classifier, a method for training a smoothed classifier, a method for operating a smoothed classifier, a method for providing an actuator control signal, a computer program and a machine-readable storage medium.

BACKGROUND INFORMATION

In safety-critical applications like, for example, highly automated driving, it is important that a classification and/or semantic segmentation of an input signal depending on which further actions of the system are selected is correct.

However, without appropriate counter-measures, classifiers, like, e.g., neural network classification systems can easily be fooled. Classifiers which may be based on deep learning may be sensitive to small perturbations. In order to deploy such systems in the physical world it is important to provide a proof about the system's robustness.

"Certified Robustness to Adversarial Examples with Differential Privacy", arXiv preprint arXiv:1802.03471v3, 2018, Mathias Lecuyer, Vaggelis Atlidakis, Roxana Geambasu, Daniel Hsu, Suman Jana and "Second-Order Adversarial Attack and Certifiable Robustness", arXiv preprint arXiv: 1809.03113v1, 2018, Bai Li, Changyou Chen, Wenlin Wang, Lawrence Carin describe a randomization technique to create a certifiably robust classifier based on a given classifier f, that maps an input signal to classes $\mathcal{K}$. Classifier f is also called a base classifier in this context. They also presented certifiably robust bounds for such a smoothed classifier.

SUMMARY

A smoothed classifier g may be defined as follows: When presented with an input x, the smoothed classifier g returns the most likely prediction by base classifier f under noise, in particular under random Gaussian perturbations of input signal x:

$$g(x) = \underset{c \in \mathcal{K}}{\operatorname{argmax}} \mathbb{P}(f(x + \epsilon) = c) \quad (1)$$

where $\epsilon \sim \mathcal{N}(0, \sigma^2 I)$ for some predefined variance $\sigma^2$.

In order to be sure that the classification of said smoothed classifier g is correct, it is important to have guaranteed robustness. A method in accordance with an example embodiment of the present invention may yield a robustness value (also called a robustness bound) $\mathcal{R}$ that guarantees that the classification yielded by smoothed classifier g is the same for all input vectors that lie within a ball of radius $\mathcal{R}$ around input signal x.

Therefore, in a first aspect, the present invention is concerned with a computer-implemented method for assessing a robustness of a smoothed classifier (g) for classifying sensor signals received from a sensor (30). In accordance with an example embodiment of the present invention, the method comprises the following steps:

determining an input signal depending on said sensor signal, determining, by the smoothed classifier (g) a first value ($p_A$) which characterizes a probability that said input signal (x), when subjected to noise, will be classified as belonging to a first class ($c_A$) out of a predefined plurality of classes, wherein said first class ($c_A$) is a most probable class, determining, by the smoothed classifier (g), a second value ($p_B$) which characterizes a probability that said input signal (x), when subjected to said noise will be classified as belonging to a second class ($c_B$) out of said predefined plurality of classes, wherein said second class ($c_B$) is a second-most probable class, determining the robustness value $\mathcal{R}$ on a first inverse value ($\Phi^{-1}(p_A)$) of a standard Gaussian cumulative distribution function at said first value ($p_A$) and/or depending on a second inverse value ($\Phi^{-1}(p_B)$) of said standard Gaussian cumulative distribution function at said second value ($p_B$).

It may then be decided that the smoothed classifier (g) is robust if and only if said robustness value $\mathcal{R}$ is larger than a predefined threshold.

For example, said predefined threshold may be given by a quantity characterizing noise in said sensor signals.

In a preferred embodiment, said robustness value $\mathcal{R}$ is determined proportional to $\Phi^{-1}(p_A) - \Phi^{-1}(p_B)$, preferably $\sigma \cdot (\Phi^{-1}(p_A) - \Phi^{-1}(p_B))$.

If it is chosen equal to $$\mathcal{R} = \frac{\sigma}{2}(\Phi^{-1}(p_A) - \Phi^{-1}(p_B)), \quad (2)$$

the bound is tight. This bound is substantially larger and therefore more useful than previously known bounds. In mathematical terms, $p_A$ is a lower bound on $\mathbb{P}(f(x+\epsilon)=c_A)$, $p_B$ is an upper bound on $$\max_{c \neq c_A} \mathbb{P}(f(x+\epsilon) = c).$$

To compute the robustness value $\mathcal{R}$ around input signal x, it is necessary to compute $p_A$ and $p_B$. However, if the input signal is high-dimensional, it is impossible to exactly compute the distribution of $f(x+\epsilon)$, which is a discrete distribution over the set of possible classes $\mathcal{K}$. That is because in order to compute g(x) exactly, it is necessary to compute $f(x+\epsilon)$ over all possible states $x+\epsilon$ and integrate a Gaussian along the set $S_A = \{x+\epsilon | f(x+\epsilon) = c_A\}$.

A good approximation can be obtained by Monte Carlo estimation to construct bounds $p_A$ and $p_B$ that satisfy $$\mathbb{P}(f(x+\epsilon) = c_A) \geq p_A \geq p_B \geq \max_{c \neq c_A} \mathbb{P}(f(x+\epsilon) = c) \quad (3)$$

with arbitrarily high probability $1-\alpha$ over the Monte Carlo samples.

Estimating $p_A$ and $p_B$ while simultaneously identifying the top class $c_A$ is potentially inefficient. A straightforward implementation would compute $p_i = \mathbb{P}(f(x+\epsilon) = c_i)$ for all classes $c_i$ and then identify $c_A$ as the class with the largest $p_i$. This is guaranteed to be precise, but expensive to compute.

One way is a two-step procedure. First, use $n_0$ samples from $f(x+\epsilon)$ to take a guess $\overline{c_A}$ at the identity of the top class $c_A$. Since meaningfully large radii can only be certified when $f(x+\epsilon)$ puts almost all its mass on the top class, it is possible to take $n_0$ very small, e.g., $n_0$=3. Second, use n samples from $f(x+\epsilon)$ to obtain $p_A$ and $p_B$ that satisfy (2) with probability 1−α for a predefined value of α. It can be observed that it is much more typical for the mass of $f(x+\epsilon)$ outside top class $c_A$ to be allocated entirely to one remaining class than to be spread uniformly over all remaining classes. Therefore, it is possible to determine $p_B$ as $p_B$=1−$p_A$, which is highly efficient, while at the same time being a very precise upper bound.

In a further aspect of the present invention, it is possible to apply the above method to a test set comprising a plurality of test input signals $(x_i)$. Using said test input signal $(x_i)$ as input signal (x) as above, it is then possible to determine a plurality of test robustness values ($\mathcal{R}_i$), each corresponding to one of the test input signals $(x_i)$. It is then possible to determine an overall robustness value ($\mathcal{R}_{ov}$) that characterizes the determined set of test robustness values ($\mathcal{R}_i$), for example its minimum value.

It may then be decided that the smoothed classifier (g) is robust if and only if said overall robustness value $\mathcal{R}_{ov}$ is larger than a predefined threshold.

Alternatively, it is then possible to determine whether said smoothed classifier (g) is robust or not based on a relative size of said robustness value ($\mathcal{R}$) and said overall robustness value ($\mathcal{R}_{ov}$). Said relative size is an indicator whether said input signal (x) is meaningfully represented by the test set, or not, or, in other words, whether said input signal (x) is representative of said test set. For example, it may be determined that said smoothed classifier (g) is robust if and only if said relative size, for example a quotient $\mathcal{R}/\mathcal{R}_{ov}$, is larger than a second predefined threshold.

In a further aspect of the present invention, this decision whether the smoothed classifier (g) is robust or not as a cut-off criterion is used for training of said smoothed classifier (g), wherein training is continued if said smooth classifier (g) is determined to be non-robust.

In a still further aspect of the present invention, it is possible to use relative size for training during operation of said smoothed classifier. In accordance with an example embodiment of the present invention, it may be provided to operate said smoothed classifier (g), determining whether said smoothed classifier (g) is robust or not using the above method, and, if said smoothed classifier (g) is determined to be non-robust based on said relative size, send said input signal (x) to a remote server, receive, from said remote server, a target classification of said input signal (x), and further train said smoothed classifier (g) using said input signal (x) and said target classification. For example, said target classification may have been provided by a human expert. Remote may mean that said remote server and a computer executing said smoothed classifier are not integrated in a single unit.

In another still further aspect of the present invention, it is possible to use said robustness value $\mathcal{R}$ as a trigger for closer inspection, by determining, using the above method, said robustness value ($\mathcal{R}$) of said smoothed classifier (g) when provided with said input signal (x) and adjusting operating parameters of said sensor (30) depending on said robustness value. In particular, said sensor (30) may be controlled to zoom into a region that is classified as non-robust.

In another still further aspect of the present invention, it is possible to use robustness value $\mathcal{R}$ for safe operation of an actuator, by assessing whether said smoothed classifier (g) is robust or not using the above method, and determining an actuator control signal (A) for controlling said actuator in accordance with a result of said assessment, in particular by determining said actuator control signal (A) to cause said actuator to operate in a safe mode if said smoothed classifier (g) is deemed not robust as a result of said assessment.

Naturally, the above methods are not limited in application to automated driving. In other applications, said actuator may be controlling an at least partially autonomous robot (100) and/or a manufacturing machine (200)) and/or an access control system (300).

Example embodiments of the present invention are discussed with reference to the following figures in more detail below.

DETAILED DESCRIPTION OF EXAMPLE EMBODIMENTS

Figure 1:
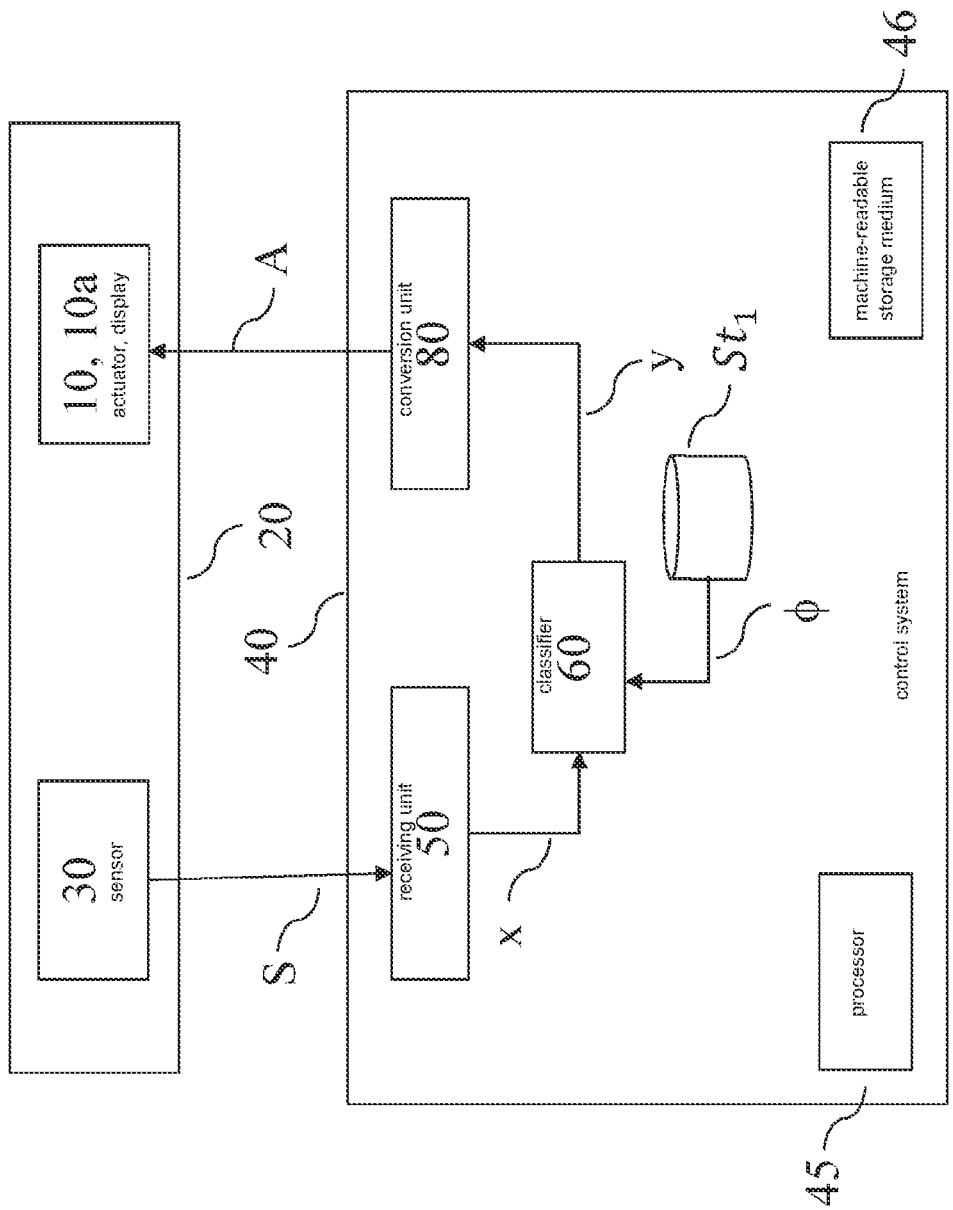
FIG. 1 shows a control system having a classifier controlling an actuator in its environment, in accordance with an example embodiment of the present invention.

Shown in FIG. 1 is one embodiment of an actuator 10 in its environment 20. Actuator 10 interacts with a control system 40. Actuator 10 and its environment 20 will be jointly called actuator system. At preferably evenly spaced distances, a sensor 30 senses a condition of the actuator system. The sensor 30 may comprise several sensors. Preferably, sensor 30 is an optical sensor that takes images of the environment 20. An output signal S of sensor 30 (or, in case the sensor 30 comprises a plurality of sensors, an output signal S for each of the sensors) which encodes the sensed condition is transmitted to the control system 40.

Thereby, control system 40 receives a stream of sensor signals S. It then computes a series of actuator control commands A depending on the stream of sensor signals S, which are then transmitted to actuator 10.

Control system 40 receives the stream of sensor signals S of sensor 30 in an optional receiving unit 50. Receiving unit 50 transforms the sensor signals S into input signals x. Alternatively, in case of no receiving unit 50, each sensor signal S may directly be taken as an input signal x. Input signal x may, for example, be given as an excerpt from sensor signal S. Alternatively, sensor signal S may be processed to yield input signal x. Input signal x comprises image data corresponding to an image recorded by sensor 30. In other words, input signal x is provided in accordance with sensor signal S.

Input signal x is then passed on to a classifier 60, which may, for example, be given by an artificial neural network.

Classifier 60 is parametrized by parameters $\phi$, which are stored in and provided by parameter storage $St_1$.

Classifier 60 determines output signals y from input signals x. The output signal y comprises top class $c_A$ and robustness value $\mathcal{R}$. Naturally, top class $c_A$ and robustness value $\mathcal{R}$ may correspond to a classification of the entire input signal x. Alternatively, it may be given as a semantic segmentation, e.g., by assigning classes to bounding boxes. Output signals y are transmitted to an optional conversion unit 80, which is configured to determine actuator control commands A. Actuator control commands A are then transmitted to actuator 10 for controlling actuator 10 accordingly. Alternatively, output signals y may directly be taken as control commands A.

Actuator 10 receives actuator control commands A, is controlled accordingly and carries out an action corresponding to actuator control commands A. Actuator 10 may comprise a control logic which transforms actuator control command A into a further control command, which is then used to control actuator 10.

In further embodiments, control system 40 may comprise sensor 30. In even further embodiments, control system 40 alternatively or additionally may comprise actuator 10.

In still further embodiments, control system 40 may control a display 10a instead of an actuator 10.

Furthermore, control system 40 may comprise a processor 45 (or a plurality of processors) and at least one machine-readable storage medium 46 on which instructions are stored which, if carried out, cause control system 40 to carry out a method according to one aspect of the present invention.

Figure 2:
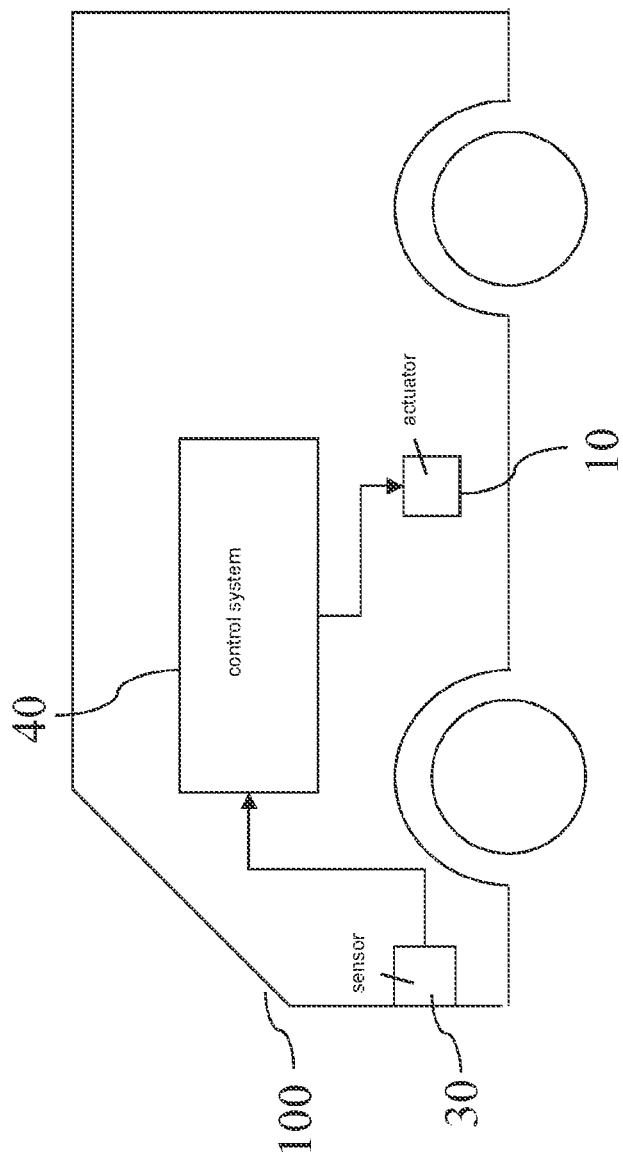
FIG. 2 shows the control system controlling an at least partially autonomous robot, in accordance with an example embodiment of the present invention.

FIG. 2 shows an embodiment in which control system 40 is used to control an at least partially autonomous robot, e.g., an at least partially autonomous vehicle 100.

Sensor 30 may comprise one or more video sensors and/or one or more radar sensors and/or one or more ultrasonic sensors and/or one or more LiDAR sensors and or one or more position sensors (like, e.g., GPS). Some or all of these sensors are preferably but not necessarily integrated in vehicle 100.

Alternatively or additionally sensor 30 may comprise an information system for determining a state of the actuator system. One example for such an information system is a weather information system which determines a present or future state of the weather in environment 20.

For example, using input signal x, the classifier 60 may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 10, which is preferably integrated in vehicle 100, may be given by a brake, a propulsion system, an engine, a drivetrain, or a steering of vehicle 100. Actuator control commands A may be determined such that actuator (or actuators) 10 is/are controlled such that vehicle 100 avoids collisions with said detected objects. Detected objects may also be classified according to what the classifier 60 deems them most likely to be, e.g., pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 30, preferably an optical sensor, to determine a state of plants in the environment 20. Actuator 10 may be a nozzle for spraying chemicals. Depending on an identified species and/or an identified state of the plants, an actuator control command A may be determined to cause actuator 10 to spray the plants with a suitable quantity of suitable chemicals.

In even further embodiments, the at least partially autonomous robot may be given by a domestic appliance (not shown), like, e.g., a washing machine, a stove, an oven, a microwave, or a dishwasher. Sensor 30, e.g., an optical sensor, may detect a state of an object which is to undergo processing by the household appliance. For example, in the case of the domestic appliance being a washing machine, sensor 30 may detect a state of the laundry inside the washing machine. Actuator control signal A may then be determined depending on a detected material of the laundry.

Figure 3:
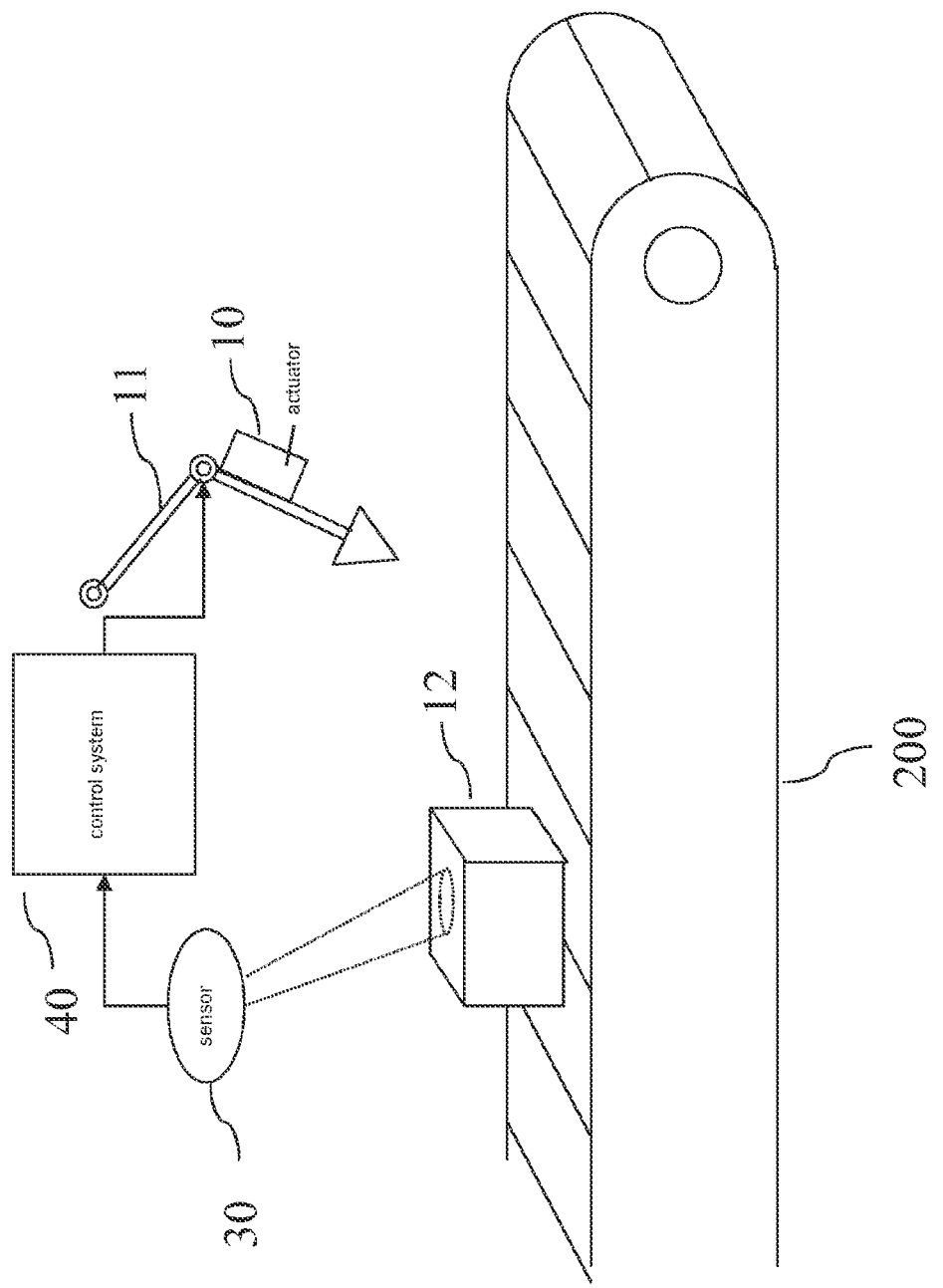
FIG. 3 shows the control system controlling a manufacturing machine, in accordance with an example embodiment of the present invention.

Shown in FIG. 3 is an embodiment in which control system 40 is used to control a manufacturing machine 11, e.g., a punch cutter, a cutter or a gun drill) of a manufacturing system 200, e.g., as part of a production line. The control system 40 controls an actuator 10 which in turn control the manufacturing machine 11.

Sensor 30 may be given by an optical sensor which captures properties of, e.g., a manufactured product 12. Classifier 60 may determine a state of the manufactured product 12 from these captured properties. Actuator 10 which controls manufacturing machine 11 may then be controlled depending on the determined state of the manufactured product 12 for a subsequent manufacturing step of manufactured product 12. Or, actuator 10 may be controlled during manufacturing of a subsequent manufactured product 12 depending on the determined state of the manufactured product 12.

Figure 4:
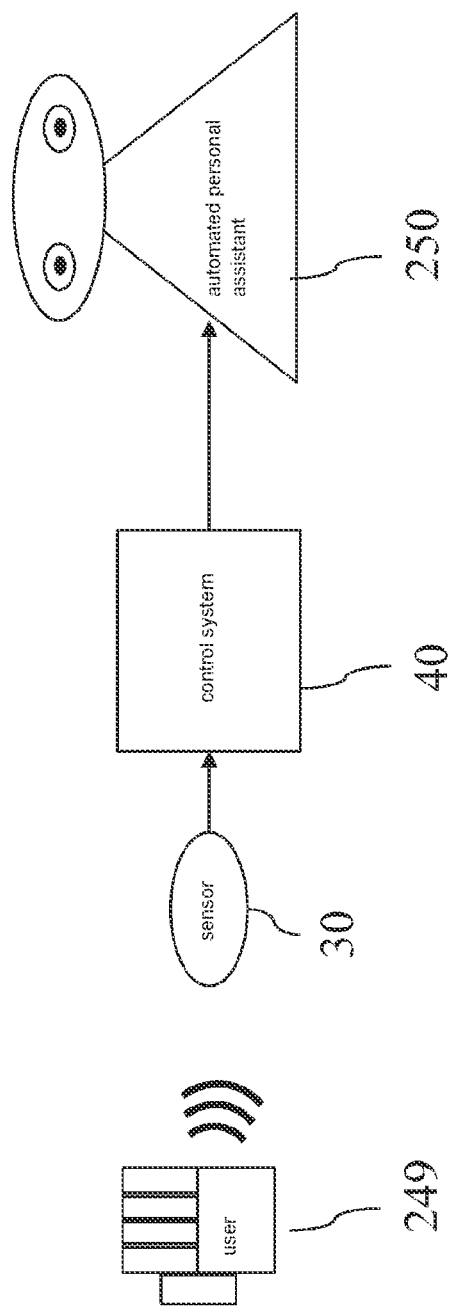
FIG. 4 shows the control system controlling an automated personal assistant, in accordance with an example embodiment of the present invention.

Shown in FIG. 4 is an embodiment in which control system 40 is used for controlling an automated personal assistant 250. Sensor 30 may be an optic sensor, e.g., for receiving video images of a gestures of user 249. Alternatively, sensor 30 may also be an audio sensor, e.g., for receiving a voice command of user 249.

Control system 40 then determines actuator control commands A for controlling the automated personal assistant 250. The actuator control commands A are determined in accordance with sensor signal S from sensor 30. Sensor signal S is transmitted to the control system 40. For example, classifier 60 may be configured to, e.g., carry out a gesture recognition algorithm to identify a gesture made by user 249. Control system 40 may then determine an actuator control command A for transmission to the automated personal assistant 250. It then transmits said actuator control command A to the automated personal assistant 250.

For example, actuator control command A may be determined in accordance with the identified user gesture recognized by classifier 60. It may then comprise information that causes the automated personal assistant 250 to retrieve information from a database and output this retrieved information in a form suitable for reception by user 249.

In further embodiments, instead of the automated personal assistant 250, control system 40 controls a domestic appliance (not shown) controlled in accordance with the identified user gesture. The domestic appliance may be a washing machine, a stove, an oven, a microwave or a dishwasher.

Figure 5:
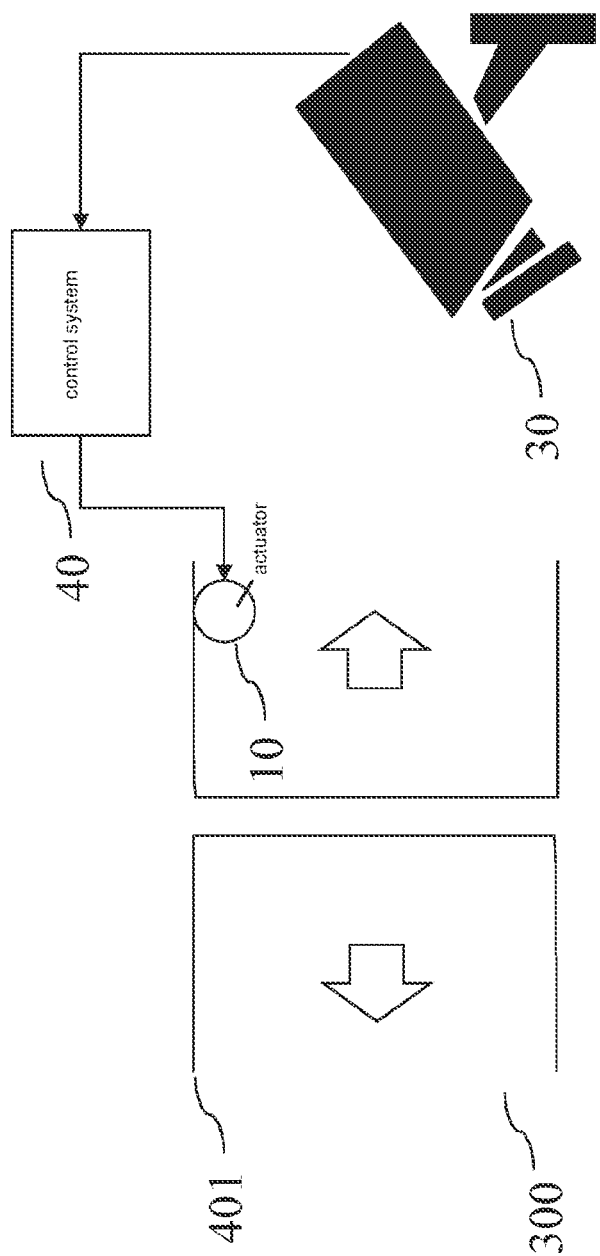
FIG. 5 shows the control system controlling an access control system, in accordance with an example embodiment of the present invention.

Shown in FIG. 5 is an embodiment in which control system controls an access control system 300. Access control system may be designed to physically control access. It may, for example, comprise a door 401. Sensor 30 is configured to detect a scene that is relevant for deciding whether access is to be granted or not. It may for example be an optical sensor for providing image or video data, for detecting a person's face. Classifier 60 may be configured to interpret this image or video data, e.g., by matching identities with known people stored in a database, thereby determining an identity of the person. Actuator control signal A may then be determined depending on the interpretation of classifier 60, e.g., in accordance with the determined identity. Actuator 10 may be a lock which grants access or not depending on actuator control signal A. A non-physical, logical access control is also possible.

Figure 6:
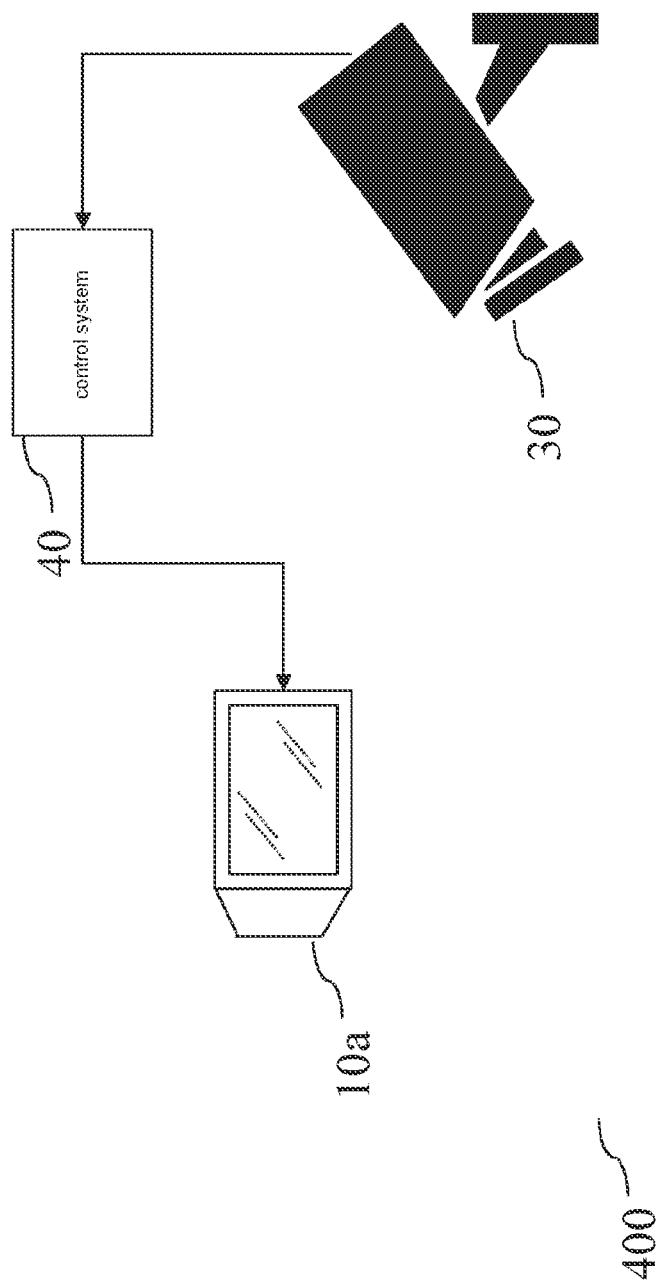
FIG. 6 shows the control system controlling a surveillance system, in accordance with an example embodiment of the present invention.

Shown in FIG. 6 is an embodiment in which control system 40 controls a surveillance system 400. This embodiment is largely identical to the embodiment shown in FIG. 5. Therefore, only the differing aspects will be described in detail. Sensor 30 is configured to detect a scene that is under surveillance. Control system does not necessarily control an actuator 10, but a display 10a. For example, the machine learning system 60 may determine a classification of a scene, e.g., whether the scene detected by optical sensor 30 is suspicious. Actuator control signal A which is transmitted to display 10a may then, e.g., be configured to cause display 10a to adjust the displayed content dependent on the determined classification, e.g., to highlight an object that is deemed suspicious by machine learning system 60.

Figure 7:
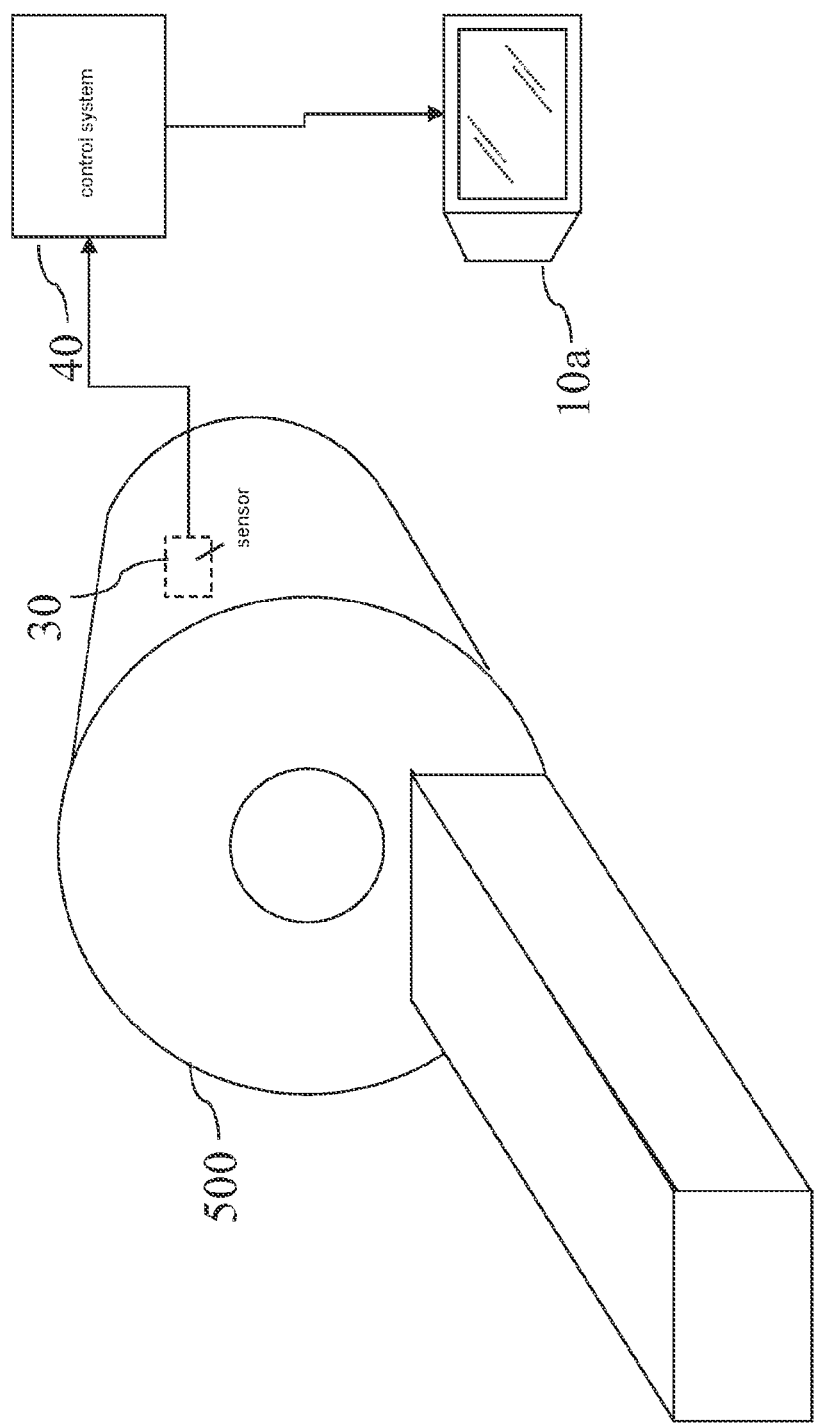
FIG. 7 shows the control system controlling an imaging system, in accordance with an example embodiment of the present invention.

Shown in FIG. 7 is an embodiment of a control system 40 for controlling an imaging system 500, for example an MRI apparatus, x-ray imaging apparatus or ultrasonic imaging apparatus. Sensor 30 may, for example, be an imaging sensor. Machine learning system 60 may then determine a classification of all or part of the sensed image. Actuator control signal A may then be chosen in accordance with this classification, thereby controlling display 10a. For example, machine learning system 60 may interpret a region of the sensed image to be potentially anomalous. In this case, actuator control signal A may be determined to cause display 10a to display the imaging and highlighting the potentially anomalous region.

Figure 8:
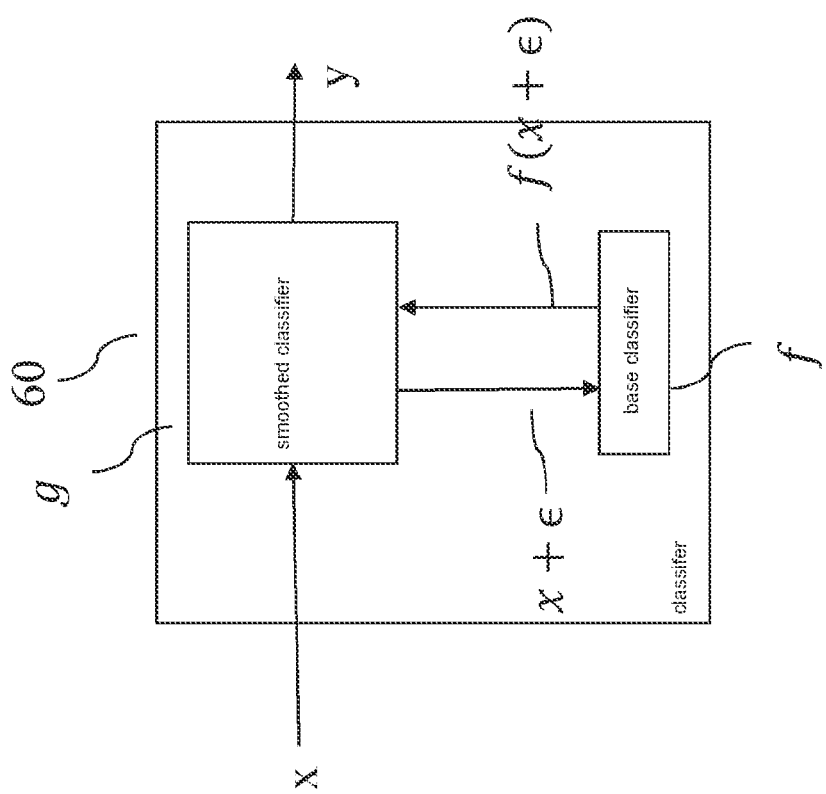
FIG. 8 shows an embodiment of a structure of said classifier, in accordance with an example embodiment of the present invention.

FIG. 8 illustrates schematically a structure of one embodiment of classifier 60. Classifier 60 comprises smoothed classifier g and base classifier f, e.g., a deep neural network. Input signal x is inputted into smoothed classifier g, which is configured to sample a plurality of random numbers $\epsilon$ from a standard Gaussian distribution with a predefined standard deviation $\sigma$ and add them onto input signal x. For each random number $\epsilon$, base classifier f is configured to return a corresponding classification $f(x+\epsilon)$. Using this plurality of classifications $f(x+\epsilon)$, the smoothed classifier g is then configured to determine top class $c_A$ and robustness value $\mathcal{R}$, e.g., by using the algorithms illustrated in FIGS. 9 and 10, and output top class $c_A$ and robustness value $\mathcal{R}$ collectively as output signal y. Because of the structure of classifier 60, smoothed classifier g and classifier 60 are used interchangeably.

Figure 9:
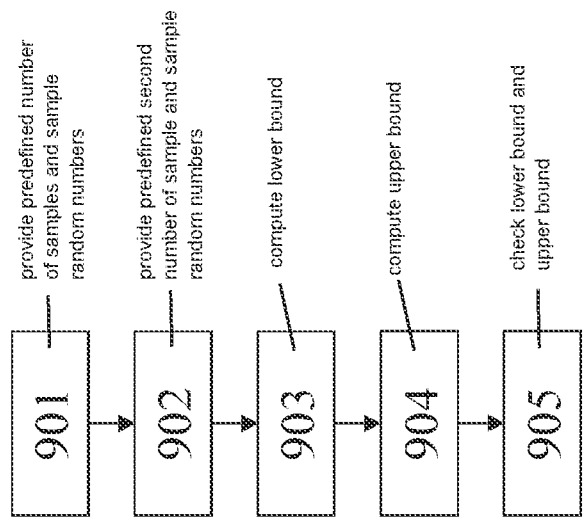
FIG. 9 shows a flow-chart diagram of an algorithm for determining robustness value $\mathcal{R}$, in accordance with an example embodiment of the present invention.

Shown in FIG. 9 is a flow-chart diagram of an embodiment of a method for determining robustness value $\mathcal{R}$. First (901), a predefined number of samples $n_0$ is provided and $n_o$ random numbers $\epsilon$ are sampled from the standard Gaussian distribution with a predefined standard deviation $\sigma$ are added onto input signal x. For each random number $\epsilon$, base classifier f returns a corresponding classification $f(x+\epsilon)$. Estimated top class $\overline{c_A}$ is then determined as the class that occurs most often amongst these corresponding classifications $f(x+\epsilon)$.

Then (902), a predefined second number of samples n is provided and n random numbers $\epsilon$ are sampled from the standard Gaussian distribution with predefined standard deviation $\sigma$ are added onto input signal x. For each random number $\epsilon$, base classifier f returns a corresponding classification $f(x+\epsilon)$. By counting the number of occurrences of estimated top class $\overline{c_A}$, a relative frequency $$\overline{p} = \frac{k}{n}$$

of estimated top class $\overline{c_A}$ is computed. Here, the absolute frequency of occurrences of estimated top class $\overline{c_A}$ is denoted as k.

Next (903), because the statistical sample with n data points is subject to fluctuations, lower bound $p_A$ satisfying $\mathbb{P}(f(x+\epsilon)=c_A) \geq p_A$ is computed as a lower confidence bound with probability at least $1-\alpha$. This expression may conveniently given by the a quantile of the beta-distribution with parameters k and n−k+1.

For example one could use the following formula with $F_{a,b,c}$ being the 1−c quantile of the F-distribution with parameters a and b. Then, the lower bound $p_A$ may be given by equation $$p_A = \left(1 + \frac{n-k+1}{k \cdot F_{2k,2(n-k+1),1-\alpha}}\right)^{-1}.$$

Upper bound $p_B$ is computed (904) as $p_B = 1 - p_A$.

Then (905) it is checked whether $p_A \geq p_B$, in which case the robustness value $\mathcal{R}$ is computed using equation (2). If $p_A < p_B$, the algorithm abstains and issues a default error message, e.g., by setting $\mathcal{R} = -1$. This concludes the method.

Figure 10:
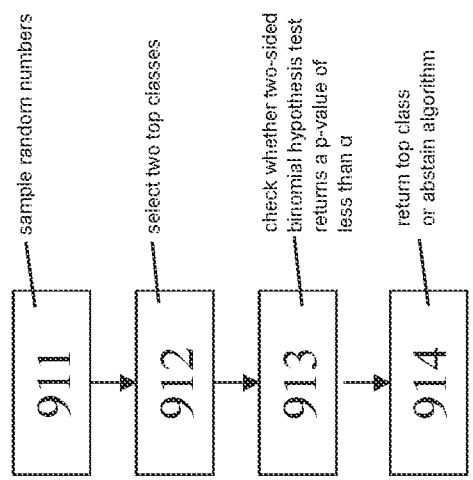
FIG. 10 shows a flow-chart diagram of a part of an alternative algorithm for determining robustness value $\mathcal{R}$, in accordance with an example embodiment of the present invention.

FIG. 10 illustrates an alternative embodiment of a method for determining top class $c_A$ that is less likely to abstain if the top two classes of $f(x+\epsilon)$ have similar mass. First (911), n random numbers $\epsilon$ are sampled from the standard Gaussian distribution with predefined standard deviation $\sigma$ are added onto input signal x. For each random number $\epsilon$, base classifier f returns a corresponding classification $f(x+\epsilon)$.

Then (912) the top two classes $c_A$, $c_B$ are selected as the two most frequently occurring classes amongst these classifications $f(x+\epsilon)$. $n_A$ and $n_B$ denote their absolute frequencies. Then (913), it is checked whether the two-sided binomial hypothesis test that $n_A$ is drawn from Binomial (½, $n_A + n_B$) returns a p-value of less than $\alpha$. If this is the case (914), top class $c_A$ is returned, otherwise the algorithm abstaind.

Figure 11:
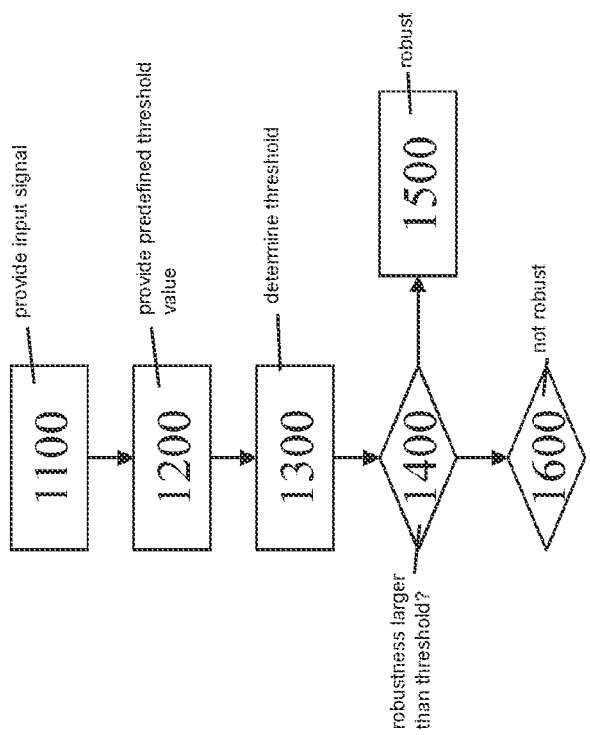
FIG. 11 shows a flow-chart diagram of a method for determining whether a classifier is robust, in accordance with an example embodiment of the present invention.

Shown in FIG. 11 is a flow-chart diagram of an embodiment of a method for determining whether classifier 60 is robust. First (1100), input signal x which is derived from sensor signal S is provided. Input signal x may be noisy, because sensor signal S may be noisy. Then (1200), predefined threshold value $\tau$ is provided. For example, it is possible to provide environmental conditions to which sensor 30 is subjected, e.g., a temperature or a humidity value of air surrounding sensor 30. Then (1300), threshold $\tau$ may be determined depending on said environmental conditions, e.g., by means of a look-up table. Threshold $\tau$ may be chosen to characterize noise produced by sensor 30, e.g., a standard deviation or statistical variations of pixel values, if sensor 30 is an image or video sensor. Then, robustness value $\mathcal{R}$ is provided for input signal x. Then (1400), it is determined whether robustness value $\mathcal{R}$ is larger than $\tau$. If that is the case (1500), classifier 60 is determined to be robust. If not (1600), classifier 60 is determined not to be robust.

Figure 12:
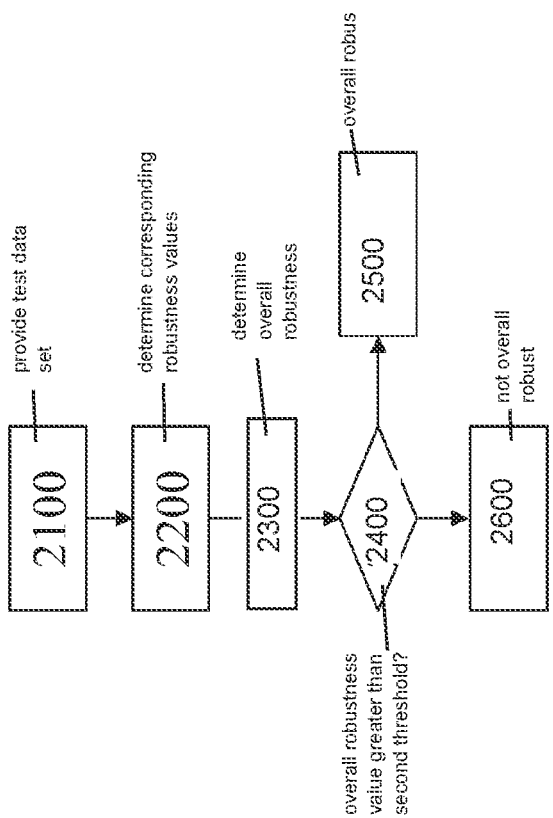
FIG. 12 shows a flow-chart diagram illustrating of a method for determining whether a classifier 60 is overall robust, in accordance with an example embodiment of the present invention.

Shown in FIG. 12 is a flow-chart diagram of an embodiment of a method for determining whether a classifier 60 is overall robust. To this end, a test data set comprising test input signals $x_i$ is provided (2100). Preferably, said test data set is representative of real-world input data. Then (2200), for each test input signal $x_i$, a corresponding robustness value $\mathcal{R}_i$ is determined, e.g., by using the method illustrated in FIG. 9 and providing test input signal $x_i$ as input signal x. Next (2300), overall robustness value $\mathcal{R}_{ov}$ is determined from the set of robustness values $\{\mathcal{R}_i\}$ by taking a value that characterizes this set, e.g., the minimum value, i.e., $$\mathcal{R}_{ov} = \min_i \mathcal{R}_i.$$

Alternatively, overall robustness value may be selected differently, e.g., as the median or average value of all $\mathcal{R}_i$. Then (2400), it is decided whether said overall robustness value $\mathcal{R}_{ov}$ is greater than a second threshold value $\tau_2$, which may be provided like threshold value $\tau$ in step (1200). If this is the case, classifier 60 is deemed to be overall robust (2500), if not (2600), it is deemed not to be overall robust.

Figure 13:
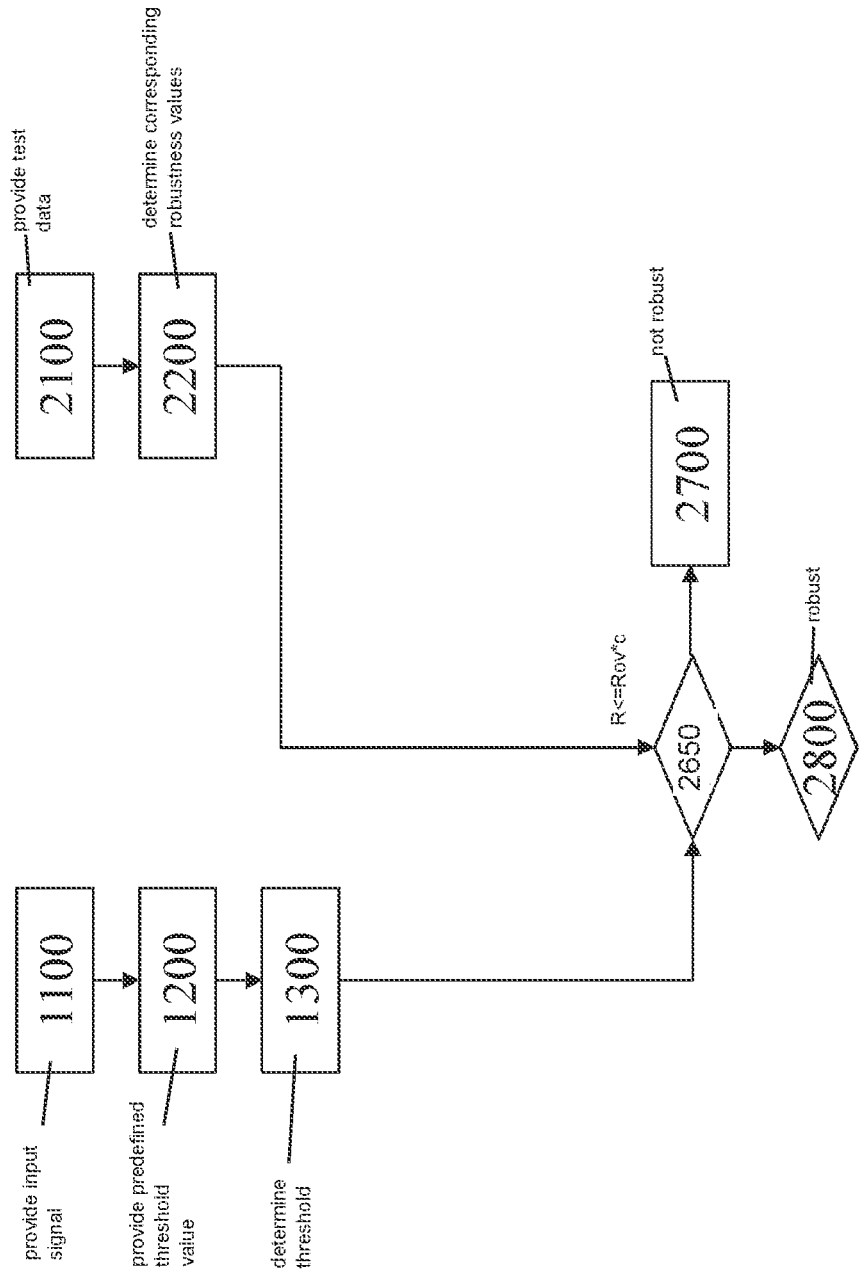
FIG. 13 shows a flow-chart diagram for illustrating of a method for determining whether an input signal x is well represented in a test set, in accordance with an example embodiment of the present invention.

Shown in FIG. 13 is a flow-chart diagram of an embodiment of a method for determining whether an input signal x is well represented in test set $\{x_i\}$ and hence, if classifier 60 trained using said test set is robust around input signal x.

Steps (2100) and (2200) are identical to those in the method illustrated in FIG. 12, steps (1100), (1200) and (1300) are identical to those in the method illustrated in FIG. 11. After robustness value $\mathcal{R}$ and overall robustness value $\mathcal{R}_{ov}$ have been determined, it is checked (2650), whether they satisfy inequality $$\mathcal{R} \leq \mathcal{R}_{ov} \cdot c \qquad (4)$$

If this is the case (2700), input signal x is deemed not to be well represented in the test set and hence classifier 60 trained using the test set is deemed not robust. If this is not the case (2800), input signal x is deemed to be well represented in the test set, and hence classifier 60 is deemed to be robust.

Figure 14:
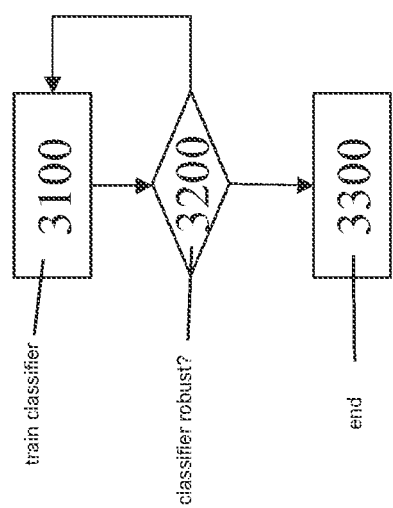
FIG. 14 shows a flow-chart diagram illustrating another method for operating classifier 60, in accordance with an example embodiment of the present invention.

Shown in FIG. 14 is a flow-chart diagram of an embodiment of a method for training smoothed classifier g, which is conveniently achieved by training base classifier f associated with smoothed classifier g, and also simply referred to as 'training classifier 60'. First, classifier 60 is trained (3100). Then (3200) the overall robustness $\mathcal{R}_{ov}$ is determined based on the test set used in training and it is determined whether classifier 60 is overall robust. If this is the case, the method concludes (3300). If it is not the case, however, the method branches back to (3100) and training continues.

An actuator control signal (A) may then (916) be determined in accordance with said parameter vu, and actuator (10) may be controlled in accordance with said actuator control signal (A). For example, if said parameter vu indicates a non-vulnerability, said actuator control signal (A) may then be determined to correspond to normal operation mode, whereas, if said parameter vu indicates a vulnerability, said actuator control signal (A) may then be determined to correspond to a fail-safe operation mode, by, e.g., reducing a dynamics of a motion of said actuator (10).

Figure 15:
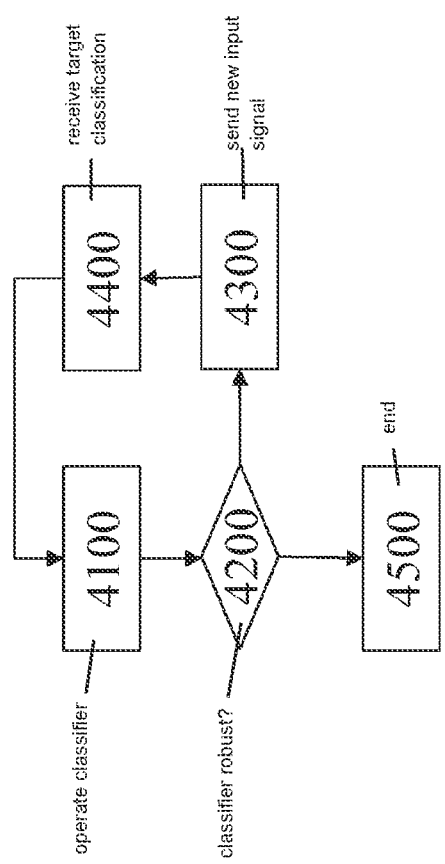
FIG. 15 shows a flow-chart diagram illustrating another method for operating classifier 60, in accordance with an example embodiment of the present invention.

Shown in FIG. 15 is a flow-chart diagram of an embodiment of a method for operating classifier 60. First (4100), classifier 60 is operated. Upon being provided with a new input signal x, it is determining (4200) whether classifier 60 is robust or not using the method in accordance with the present invention. If that is not the case, the method concludes (4500). If it is the case, however, new input signal x is sent (4300) to a remote server where it may be, for example, presented to a human expert from whom said remote server receives a manual classification as target classification. Said target classification is then (4400) receiving, from said remote server, the pair of new input signal (x) and received target classification are added to a training set which may be used to train classifier 60 before operation resumes, or at a later point in time. The method then branches back to step (4100).

Figure 16:
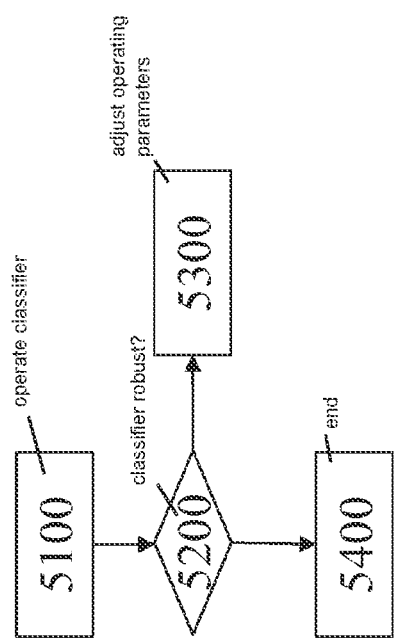
FIG. 16 shows a flow-chart diagram illustrating another method for operating classifier 60, in accordance with an example embodiment of the present invention.

Shown in FIG. 16 is a flow-chart diagram of an embodiment of a method for operating classifier 60. First (5100), classifier 60 is operated. Upon being provided with a new input signal x, it is determining (5200) whether classifier 60 is robust or not using the method according to an example embodiment of the present invention. If that is the case, the method concludes (5400), If it is not the case, however, operating parameters of sensors 30 are adjusted (5300), in particular zooming sensor 30 may zoom in on the area of new input signal x for which classifier 60 was deemed not to be robust.

Figure 17:
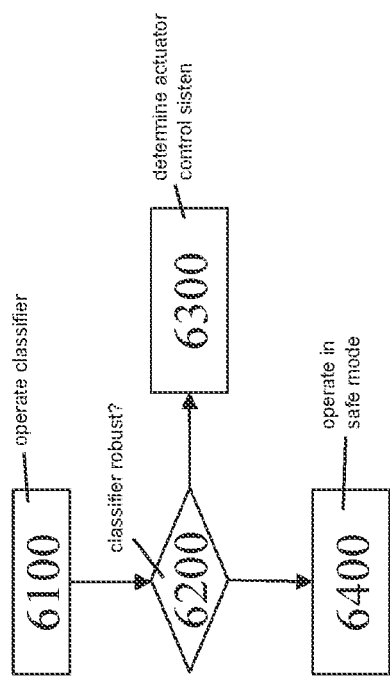
FIG. 17 shows a flow-chart diagram illustrating a method for providing actuator control signal A, in accordance with an example embodiment of the present invention.

Shown in FIG. 17 is a flow-chart diagram of an embodiment of a method for providing actuator control signal A for controlling actuator 10 depending on an output signal y of classifier 60. First (6100), classifier 60 is operated. Upon being provided with a new input signal x, it is determined whether classifier 60 is robust (6200), e.g., by using the algorithm illustrated in FIG. 9. Actuator control signal is now determined) in accordance with the result of said assessment. If operator 60 is deemed to be robust (6300), actuator control signal A is determined to cause actuator 10 to operate in normal mode. If it is not the case (6400), however, said actuator control signal (A) is determined to cause said actuator (10) to operate in a safe mode The term "computer" covers any device for the processing of pre-defined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

The invention claimed is:

1. A computer-implemented method for assessing a robustness of a smoothed classifier for classifying sensor signals received from a sensor, comprising the following steps:
   providing an input signal depending on the sensor signal;
   determining, by the smoothed classifier, a first value which characterizes a probability that the input signal, when subjected to noise, will be classified as belonging to a first class out of a predefined plurality of classes, wherein the first class is a most probable class;
   determining, by the smoothed classifier, a second value which characterizes a probability that the input signal, when subjected to the noise, will be classified as belonging to a second class out of the predefined plurality of classes, wherein the second class is a second-most probable class; and
   determining a robustness value on a first inverse value of a standard Gaussian cumulative distribution function at the first value and/or depending on a second inverse value of the standard Gaussian cumulative distribution function at the second value.

2. The method according to claim 1, wherein the robustness value is determined depending on a product of a standard deviation and a difference of the first inverse value minus the second inverse value.

3. The method according to claim 1, wherein prior to determining the first value, an step is performed including estimating which class out of the predefined plurality of classes is the first class.

4. The method according to claim 1, wherein the first value is a lower bound to the probability that the input signal, when subjected to said noise will be classified as belonging to the first class.

5. The method according to claim 1, wherein the second value is an upper bound to the probability that the input signal, when subjected to the noise will be classified as belonging to the second class.

6. The method according to claim 5, in which the second value ($p_B$) is determined as $p_B=1-P_A$, where $p_A$ is the first value.

7. The method according to claim 1, wherein the robustness value is determined depending on a product of a standard deviation and a difference of the first inverse value minus the second inverse value.

8. A computer-implemented method for assessing an overall robustness of a smoothed classifier for classifying sensor signals received from a sensor, comprising the following steps:
   providing a training set including test input signals;
   determining a test robustness value for each test input signal of the test input signals by performing, for each test input signal, the following steps:
      providing an input signal depending on the test input signal,
      determining, by the smoothed classifier, a first value which characterizes a probability that the input signal, when subjected to noise, will be classified as belonging to a first class out of a predefined plurality of classes, wherein the first class is a most probable class,
      determining, by the smoothed classifier, a second value which characterizes a probability that the input signal, when subjected to the noise, will be classified as belonging to a second class out of the predefined plurality of classes, wherein the second class is a second-most probable class, and
      determining the test robustness value on a first inverse value of a standard Gaussian cumulative distribution function at the first value and/or depending on a second inverse value of the standard Gaussian cumulative distribution; and
   determining the overall robustness as a value that characterizes the determined set of test robustness values, the value being its minimum value.

9. The computer-implemented method according to claim 1, wherein it is determined whether the smoothed classifier is robust or not based on a relative size of the robustness value and an overall robustness value.

10. A non-transitory machine-readable storage medium on which is stored a computer program for assessing a robustness of a smoothed classifier for classifying sensor signals received from a sensor, the computer program, when executed by a computer, causing the computer to perform the following steps:
   providing an input signal depending on the sensor signal;
   determining, by the smoothed classifier, a first value which characterizes a probability that the input signal, when subjected to noise, will be classified as belonging to a first class out of a predefined plurality of classes, wherein the first class is a most probable class;
   determining, by the smoothed classifier, a second value which characterizes a probability that the input signal, when subjected to the noise, will be classified as belonging to a second class out of the predefined plurality of classes, wherein the second class is a second-most probable class; and
   determining a robustness value on a first inverse value of a standard Gaussian cumulative distribution function at the first value and/or depending on a second inverse value of the standard Gaussian cumulative distribution function at the second value.

\* \* \* \* \*